US011883844B2

United States Patent
Croxford et al.

(10) Patent No.: US 11,883,844 B2
(45) Date of Patent: Jan. 30, 2024

(54) MULTI-FREQUENCY WIRELESS SENSOR

(71) Applicant: INDUCTOSENSE LIMITED, Bristol (GB)

(72) Inventors: Anthony Croxford, Bristol (GB); Paul Wilcox, Bristol (GB); Chenghuan Zhong, Bristol (GB)

(73) Assignee: INDUCTOSENE LIMITED, Bristol (GB)

( * ) Notice: Subject to any disclaimer, the term of this patent is extended or adjusted under 35 U.S.C. 154(b) by 347 days.

(21) Appl. No.: 17/049,952

(22) PCT Filed: Apr. 24, 2019

(86) PCT No.: PCT/GB2019/051144
§ 371 (c)(1),
(2) Date: Oct. 22, 2020

(87) PCT Pub. No.: WO2019/207301
PCT Pub. Date: Oct. 31, 2019

(65) Prior Publication Data
US 2021/0237120 A1    Aug. 5, 2021

(30) Foreign Application Priority Data
Apr. 25, 2018  (GB) .................................... 1806727

(51) Int. Cl.
*B06B 1/02*     (2006.01)
*G01N 29/24*    (2006.01)
(Continued)

(52) U.S. Cl.
CPC ........... *B06B 1/0269* (2013.01); *G01N 29/04* (2013.01); *G01N 29/2437* (2013.01);
(Continued)

(58) Field of Classification Search
CPC ............. B06B 1/0269; G01N 29/2481; G01N 29/348; G01N 2291/101; G01N 29/04;
(Continued)

(56) References Cited

U.S. PATENT DOCUMENTS 5,422,650 A    6/1995  Hill
7,267,009 B2   9/2007  Liu et al.
(Continued)

FOREIGN PATENT DOCUMENTS

| CN | 103424133 A | * | 12/2013 | ............. G01R 23/00 |
| GB | 2523266 A | | 8/2015 | |
| GB | 2533833 A | | 7/2016 | |
| JP | H0627805 B2 | * | 4/1994 | |
| JP | 2005020140 A | * | 1/2005 | |

OTHER PUBLICATIONS

GB, 1806727.2 Search Report, dated Oct. 25, 2018.
(Continued)

*Primary Examiner* — Lisa M Caputo
*Assistant Examiner* — Rose M Miller
(74) *Attorney, Agent, or Firm* — One LLP

(57) ABSTRACT

A multi-frequency wireless sensor for non-destructive testing of a test object, the sensor comprising: an ultrasound transducer having a plurality of operating frequencies; a first induction coil electrically coupled to the ultrasound transducer; a second induction coil; and a capacitance, connected in parallel with the second induction coil, such that the wireless sensor can operate at a first operating frequency or a second operating frequency when the sensor is excited by a remote device.

7 Claims, 15 Drawing Sheets

(51) Int. Cl.
  *H01F 27/29* (2006.01)
  *G01N 29/04* (2006.01)
  *G01N 29/34* (2006.01)
(52) U.S. Cl.
  CPC ....... *G01N 29/2481* (2013.01); *G01N 29/348* (2013.01); *G01N 2291/023* (2013.01); *G01N 2291/0289* (2013.01); *G01N 2291/044* (2013.01); *G01N 2291/101* (2013.01); *H01F 27/29* (2013.01)
(58) Field of Classification Search
  CPC ......... G01N 29/2437; G01N 2291/023; G01N 2291/0089; G01N 2291/044; H01F 27/29
  USPC .......................................................... 73/629
  See application file for complete search history.

(56) References Cited

U.S. PATENT DOCUMENTS

2010/0242611 A1    9/2010  Terazawa
2015/0097741 A1    4/2015  Pachler et al.

OTHER PUBLICATIONS

GB, PCT/GB2019/051144 ISR and Written Opinion, dated Jul. 4, 2019.
Dionigi, M. et al. "Chapter 5. Magnetic Resonant Wireless Power Transfer" In: "Wireless power transfer", Jan. 1, 2012 (Jan. 1, 2012), River Publishers, XP055599149, pp. 157-198, Section 5.4 "Adding resonators to the coupled inductors"; p. 167-171.

* cited by examiner

MULTI-FREQUENCY WIRELESS SENSOR

TECHNICAL FIELD

The present invention relates to a wireless sensor for use in non-destructive testing, and to a wireless excitation device for exciting such a wireless sensor.

BACKGROUND TO THE INVENTION

Non-destructive testing (NDT) is used extensively across a range of industries to evaluate the properties of a test object without causing damage to the test object. Examples of test objects include composite aircraft panels, gas-turbine engine components, pipelines and pressure vessels.

It is known to integrate an NDT sensor into a test object in order to provide, for example, reliable repeatable measurement and/or in situ monitoring while the test object is in service. For example, it is known to integrate an ultrasound sensor in or on a test object.

Furthermore, it is known to provide wireless integrated NDT sensors that can be inductively coupled to a remote device. The inductive coupling enables power and signals to be provided to the integrated sensor from the remote device in a similar manner to known radio-frequency identification (RFID) modules. Thus the inductive coupling can be used for the transfer of measurement information from the integrated sensor back to the remote device.

Known NDT sensors typically employ piezoelectric or other transducers to generate ultrasound waves which propagate through the test object. Reflections or echoes of these waves are detected, and can be analysed in order to detect defects in the object.

Typically, NDT systems use two types of waves: high frequency bulk waves, which are used to inspect the structure of the test object immediately beneath the transducer, and low frequency guided waves, which are used to inspect the structure in the area around the transducer. In order to generate different frequencies required for bulk wave and guided wave testing in a wireless NDT system, two different types of sensor are used: one which can generate the high frequency bulk waves and another which can generate the lower-frequency guided waves. As will be appreciated, providing two different types of sensor has negative implications in terms of the cost of an NDT system, the combined weight of the sensors integrated into the test object and the physical space occupied by the sensors.

Accordingly, a need exists for an NDT sensor that alleviates some or all of these problems.

SUMMARY OF INVENTION

According to a first aspect of the present invention there is provided a multi-frequency wireless sensor for non-destructive testing of a test object, the sensor comprising: an ultrasound transducer having a plurality of operating frequencies; a first induction coil electrically coupled to the ultrasound transducer; a second induction coil; and a capacitance, connected in parallel with the second induction coil, such that the wireless sensor can operate at a first operating frequency or a second operating frequency when the sensor is excited by a remote device.

The wireless sensor of the first aspect of the present invention is able to receive excitation signals in multiple different frequencies simultaneously, and can therefore simultaneously generate both bulk waves, which can be used to detect defects in a structure (to which the sensor is attached, or in which the sensor is incorporated) immediately beneath the sensor, and guided waves, which can be used to detect defects in the structure in the vicinity of the sensor. The use of a sensor according to the first aspect can help to reduce cost, as different sensors are not required for bulk waves and guided waves. Additionally, the use of the sensor of the first aspect can increase speed and efficiency of inspection of a structure, since measurements may simultaneously be made using bulk waves and guided waves. Further, as the guided waves are reflected by structural features of the structure, such as fixtures and supports, the response of each sensor to the guided waves is different, since each sensor is installed at a different position on or in the structure under test. Thus, the unique guided wave response of each sensor can be used as an identifier for the sensor.

The second induction coil may be connected in series with the first induction coil.

Alternatively, the second induction coil may not be electrically connected to the first induction coil, but may instead be inductively coupled to the first induction coil.

The first and second induction coils, the capacitance and the ultrasound transducer may form a resonant circuit which has first and second resonant frequencies.

According to a second aspect of the invention there is provided a multi-frequency wireless excitation device for exciting a multi-frequency wireless sensor, the excitation device comprising: a first induction coil; a first capacitance electrically coupled to the first induction coil; a second induction coil; and a second capacitance connected in parallel with the second induction coil, such that the excitation device can generate an induction signal at a first operating frequency or a second operating frequency.

The excitation device of the second aspect of the invention is able to transmit excitation signals containing multiple frequencies, and can therefore be used to excite the sensor of the first aspect, thereby increasing speed and efficiency of inspection of a structure.

The first induction coil may be connected in series with the second induction coil and second capacitance, and the first capacitance may be connected in parallel with the first and second induction coils.

The second induction coil may not be electrically connected to the first induction coil, but may instead be inductively coupled to the first induction coil.

The first capacitance may be connected in parallel with the first induction coil.

The multi-frequency wireless excitation device may further comprise: means for generating a first excitation signal at a first frequency; means for generating a second excitation signal at a second frequency; and means for linearly summing the first and second excitation signals in order to generate a composite excitation signal for exciting the first and second induction coils.

According to a third aspect of the invention there is provided a non-destructive testing system comprising a sensor according to the first aspect and a wireless excitation device according to the second aspect.

According to a fourth aspect of the invention there is provided a method for non-destructive testing of an object using a sensor according to the first aspect, the method comprising: installing the sensor in or on the object to be tested; exciting the sensor with a guided wave excitation signal; receiving from the sensor a response to the guided wave excitation signal; and recording the response received from the sensor as a unique identifier for the sensor.

The method may further comprise, exciting the sensor with a bulk wave excitation signal.

The guided wave excitation signal and the bulk wave excitation signal may be transmitted to the sensor simultaneously.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
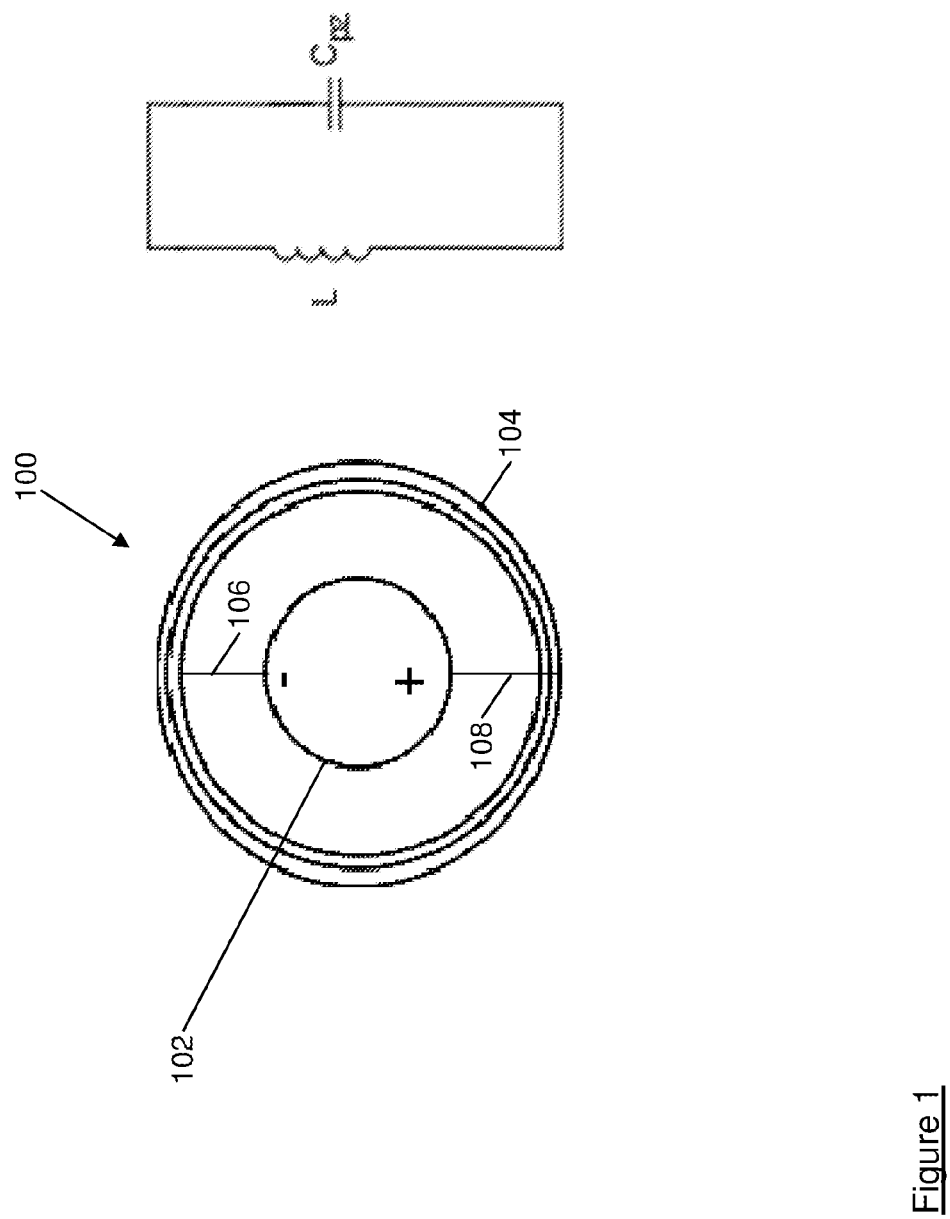
FIG. 1 is a schematic representation of a known wireless sensor for non-destructive testing and a simplified equivalent circuit of the sensor.

Referring first to FIG. 1, a known wireless sensor for non-destructive testing is shown generally at 100. The sensor 100 can be attached to or embedded in a structure or object to be tested, and can be excited by a remote device known as an inspection wand.

The sensor 100 comprises a piezoelectric ultrasound transducer 102 which is electrically coupled to a generally circular induction coil 104. The induction coil 104 enables the sensor 100 to be remotely powered by the inspection wand by inductive coupling. The induction coil 104 is connected to a negative electrode of the transducer 102 by a first connection 106 and to a positive electrode of the transducer 102 by a second connection 108.

The induction coil 104 and the ultrasound transducer 102 together form an LC circuit with a particular resonant frequency. In use, the inspection wand is brought towards the sensor 100 which induces a current in the LC circuit at the resonant frequency. This causes the transducer 102 to output an ultrasound pulse. The ultrasound pulse can reflect off a surface of the test object and the reflected signal is received by the transducer 102, producing a current in the sensor 100 that can be transmitted to the inspection wand via inductive coupling between the sensor 100 and the inspection wand.

Figure 2:
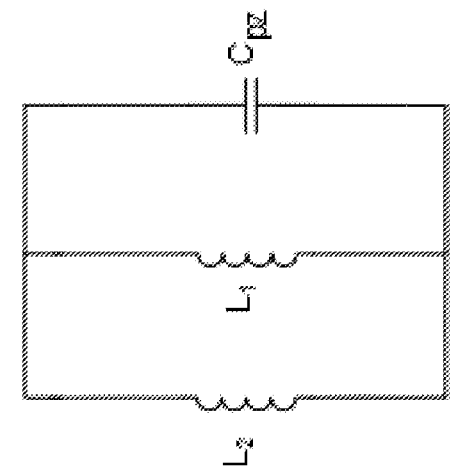
FIG. 2 is a schematic representation of a further known wireless sensor for non-destructive testing and a simplified equivalent circuit of the sensor.
Figure 2:
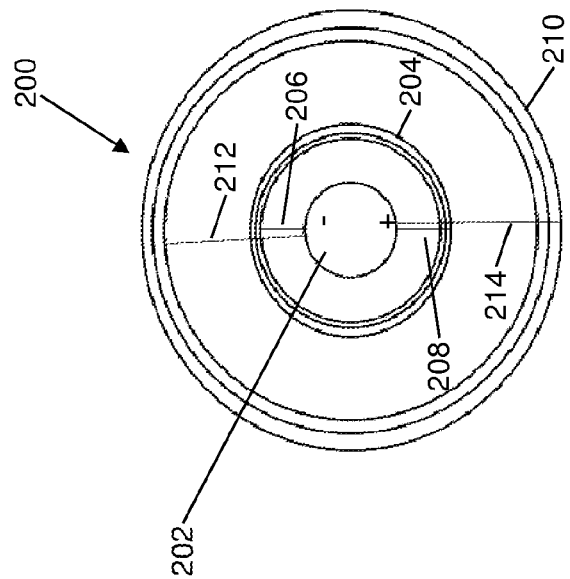

Referring now to FIG. 2, a further known wireless sensor for non-destructive testing is shown generally at 200. The wireless sensor 200 is designed to address a problem associated with the sensor 100 of FIG. 1, that the distance at which the sensor 100 can be excited by, and can transmitted data to, the inspection wand is limited by the small diameter of the induction coil 104, particular for high frequency applications.

The wireless sensor 200 comprises a piezoelectric ultrasound transducer 202 and a first generally circular induction coil 204. The first induction coil 204 is connected to a negative electrode of the transducer 202 with a first connection 206 and to a positive electrode of the transducer 202 with a second connection 208.

The wireless ultrasound sensor 200 further comprises a second generally circular induction coil 210. The second induction coil 210 is connected to the negative electrode of the transducer 202 with a third connection 212 and to the positive electrode of the transducer 202 with a fourth connection 214. Thus, the first and second induction coils 204, 210 are connected in parallel with the transducer 202.

As can be seen from the equivalent circuit shown in FIG. 2, the first and second induction coils 204, 210 and the transducer 202 together form a parallel LC resonant circuit. The arrangement of FIG. 2 permits an increase in the operable range of the sensor 200 whilst maintaining the total inductance of the sensor 200 at a level low enough to provide a resonant circuit suitable for use in high frequency applications. However, the sensor 200 of FIG. 2 is not capable of transmitting ultrasound pulses at the different frequencies required for bulk wave and guided wave testing.

Figure 3:
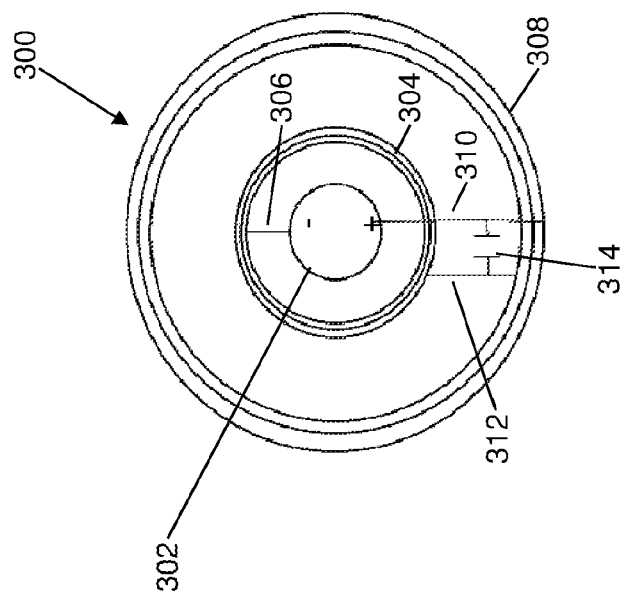
FIG. 3 is a schematic representation of an embodiment of a multi-frequency wireless sensor.

FIG. 3 is a schematic representation of a wireless ultrasound sensor which is capable of generating ultrasound pulses at two different frequencies.

The sensor, shown generally at 300, comprises a piezoelectric ultrasound transducer 302 which is electrically coupled to a first generally circular induction coil 304. A first end of the first induction coil 304 is connected to a negative electrode of the transducer 302 by a first connection 306. A positive electrode of the transducer 304 is electrically connected to a first end of a second generally circular induction coil 308 by a second connection 310. A second end of the second induction coil 308 is electrically connected to a second end of the first induction coil 304 by a third connection 312, such that the first and second induction coils 304, 308 are connected in series with one another, and the series combination of the first and second induction coils 304, 308 is connected in parallel with the transducer 302. A capacitance 314 is connected to the second and third connections 310, 310, in parallel with the second induction coil 308.

In the illustrated example, the transducer 302, first and second induction coils 304, 308 and the capacitance 314 are mounted in a planar arrangement (i.e. they all occupy substantially the same plane) on a substrate, with the transducer 302, first and second induction coils being positioned in a coaxial arrangement with the transducer 302 being positioned within the first induction coil 304, and the first induction coil 304 being positioned within the second induction coil 308. However, this arrangement need not be adopted; the transducer 302, first and second induction coils 304, 308 and capacitance 314 can be arranged in any configuration that is convenient for the requirements of a particular application of the sensor 300, and may, for example, occupy different planes. Equally, the first and section induction coils 304, 308 need not be positioned in the illustrated coaxial arrangement, but may be arranged in any configuration that is convenient for the requirements of a particular application of the sensor 300.

Figure 4:
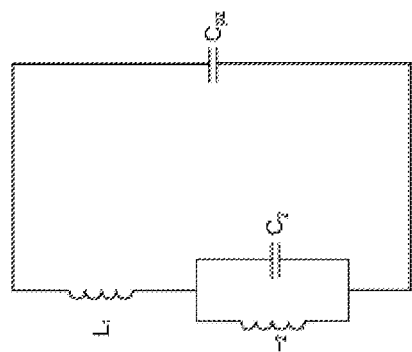
FIG. 4 is a simplified equivalent circuit of the multi-frequency wireless sensor shown in FIG. 3.

FIG. 4 is a schematic diagram showing a simplified equivalent circuit of the sensor 300 of FIG. 3. As can be seen from FIG. 4, the sensor 300 can be modelled as a capacitance $C_{pz}$ (representing the capacitance of the transducer 302) connected in parallel with a series arrangement of two inductances $L_1$ (representing the first induction coil 304) and $L_2$ (representing the second induction coil 308), and a capacitance $C_2$ (representing the capacitance 314) connected in parallel with the second inductance $L_2$.

The capacitance $C_{pz}$, inductances $L_1$ and $L_2$ and capacitance $C_2$ form a resonant circuit having a first resonant frequency and a second resonant frequency.

The first resonant frequency $f_1$, arises from the parallel combination of the inductance $L_1$ of the sensor 300 and the capacitance of the transducer 302, and can be estimated using the equation $$f_1 = \frac{1}{(2\pi\sqrt{L_1 C_{PZ}})}. \tag{1}$$

The second resonant frequency $f_2$, arises from the parallel combination of the second induction coil 308 and the capacitance 314, and can be estimated from the equation $$f_2 = \frac{1}{(2\pi\sqrt{L_2 C_2})}. \tag{3}$$

Thus, the sensor 300 of FIG. 3 has two resonant frequencies, meaning that when it is excited by excitation signals at appropriate frequencies, e.g. by an inspection wand, the transducer can generate ultrasonic pulses at different frequencies.

As will be appreciated by those skilled in the art, one or more additional resonant frequencies can be added to the sensor 300 by adding one or more additional induction coils in series with the first and second induction coils 304, 308, and an additional capacitance in parallel with each of the additional induction coils. These additional coils and capacitances can be arranged in the coaxial planar arrangement described above, or in any other arrangement or configuration that is convenient to the particular application of the sensor 300.

Figure 5:
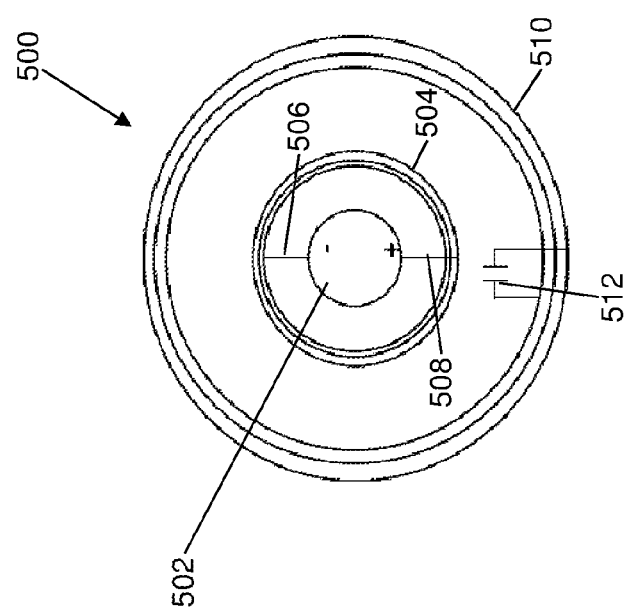
FIG. 5 is a schematic representation of an alternative embodiment of a multi-frequency wireless sensor.

Referring now to FIG. 5, an alternative wireless ultrasound sensor arrangement which is capable of generating ultrasound pulses at two different frequencies is shown generally at 500.

The sensor 500 comprises a piezoelectric ultrasound transducer 502 which is electrically coupled to a first generally circular induction coil 504. A first end of the first induction coil 504 is connected to a negative electrode of the transducer 502 by a first connection 506. A positive electrode of the transducer 504 is electrically connected to a second end of the first induction coil 504 by a second connection 508.

The sensor 500 further comprises a second generally circular induction coil 510. A capacitance 512 is connected in parallel with the second induction coil 510. The second induction coil 510 is not electrically connected to the first induction coil 504, but is instead inductively coupled to the first induction coil 504.

In the illustrated example, the transducer 502, first and second induction coils 504, 510 and the capacitance 512 are mounted in a planar arrangement (i.e. they all occupy substantially the same plane) on a substrate, with the transducer 502, first and second induction coils being positioned in a coaxial arrangement with the transducer 502 being positioned within the first induction coil 504, and the first induction coil 504 being positioned within the second induction coil 510. However, this arrangement need not be adopted; the transducer 302, first and second induction coils 504, 510 and capacitance 512 can be arranged in any configuration that is convenient for the requirements of a particular application of the sensor 500, and may, for example, occupy different planes. Equally, the first and section induction coils 504, 510 need not be positioned in the illustrated coaxial arrangement, but may be arranged in any configuration that is convenient for the requirements of a particular application of the sensor 500, provided that the first and second induction coils 504, 510 are positioned so as to permit inductive coupling between the first and second induction coils 504, 510.

Figure 6:
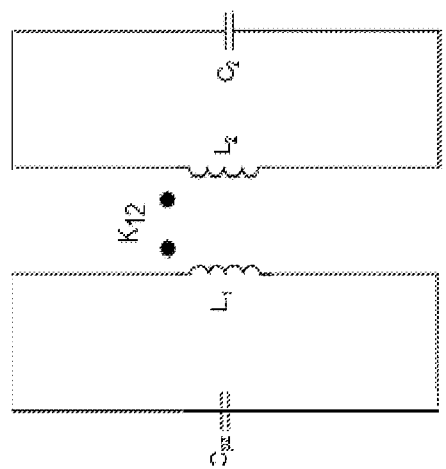
FIG. 6 is a simplified equivalent circuit of the multi-frequency wireless sensor shown in FIG. 5.

FIG. 6 is a schematic diagram showing a simplified equivalent circuit of the sensor 500 of FIG. 5. As can be seen from FIG. 6, the sensor 500 can be modelled as a capacitance $C_{pz}$ (representing the capacitance of the transducer 502) connected in parallel with an inductance $L_1$ (representing the first induction coil 504) and a capacitance $C_2$ (representing the capacitance 512) connected in parallel with an inductance $L_2$ (representing the second induction coil 510). A coupling coefficient $K_{12}$ represents the inductive coupling between the first and second induction coils 504, 510.

The capacitance $C_{pz}$, and inductance $L_1$ form a first resonant circuit having a first resonant frequency, which can be estimated using the equation $$f_1 = \frac{1}{(2\pi\sqrt{L_1 C_{pz}})} \tag{4}$$

The capacitance $C_2$, and inductance $L_2$ form a second resonant circuit having a second resonant frequency, which can be estimated using the equation $$f_2 = \frac{1}{(2\pi\sqrt{L_2 C_2})} \tag{5}$$

Thus, the sensor 500 of FIG. 5 has two resonant frequencies, meaning that when it is excited by excitation signals at appropriate frequencies, e.g. by an inspection wand, the transducer can generate ultrasonic pulses at different frequencies.

As will be appreciated by those skilled in the art, one or more additional resonant frequencies can be added to the sensor 500 by adding one or more additional induction coils to inductively couple to the first and/or second induction coil 504, 510, and an additional capacitance in parallel with each of the additional induction coils. These additional coils and capacitances can be arranged in the coaxial planar arrangement described above, or any other arrangement or configuration that is convenient to the particular application of the sensor 500.

Figure 7:
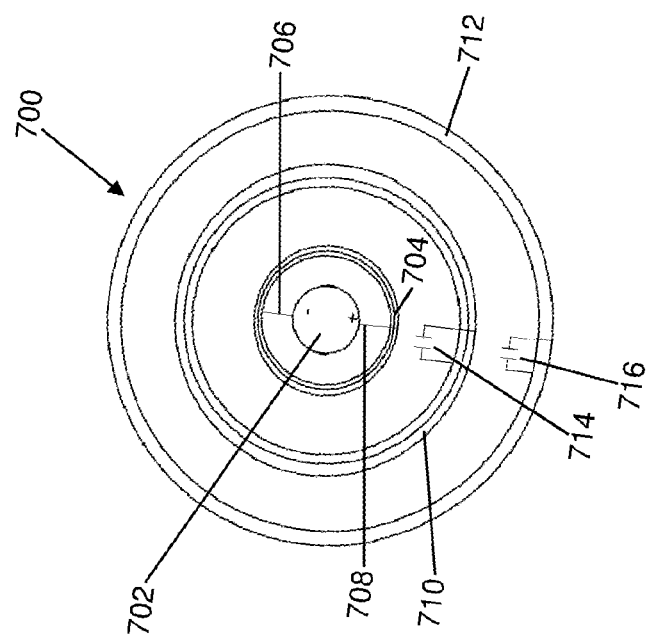
FIG. 7 is a schematic representation of a further alternative embodiment of a multi-frequency wireless sensor.

For example, FIG. 7 is a schematic representation of an alternative wireless ultrasound sensor arrangement which is capable of generating ultrasound pulses at three different frequencies.

The sensor, shown generally at 700, comprises piezoelectric ultrasound transducer 702 which is electrically coupled to a first generally circular induction coil 704. A first end of the first induction coil 704 is connected to a negative electrode of the transducer 702 by a first connection 706. A positive electrode of the transducer 704 is electrically connected to a second end of the first induction coil 704 by a second connection 708.

The sensor 700 further comprises a second generally circular induction coil 710 and a third generally circular induction coil 712. A first capacitance 714 is connected in parallel with the second induction coil 710, and a second capacitance 716 is connected in parallel with the third induction coil 712. The second induction coil 710 is not electrically connected to the first induction coil 704, but is instead inductively coupled to the first induction coil 704. Similarly, the third induction coil is not electrically connected to the second induction coil 710, but is instead inductively coupled to the second induction coil 710.

In the illustrated example, the transducer 702, first, second and third induction coils 704, 710, 712 and the capacitances 714, 716 are mounted in a planar arrangement (i.e. they all occupy substantially the same plane) on a substrate, with the transducer 702, first, second and third induction coils being positioned in a coaxial arrangement with the transducer 702 being positioned within the first induction coil 704, the first induction coil 704 being positioned within the second induction coil 710 and the second induction coil 710 being positioned within the third induction coil 712. Again, however, this arrangement need not be adopted; the transducer 702, first, second and third induction coils 704, 710, 712 and capacitances 714, 716 can be arranged in any configuration that is convenient for the requirements of a particular application of the sensor 700, and may, for example, occupy different planes. Equally, the first, second and third induction coils 704, 710, 712 need not be positioned in the illustrated coaxial arrangement, but may be arranged in any configuration that is convenient for the requirements of a particular application of the sensor 700, provided that the first, second and third induction coils 704, 710, 712 are positioned so as to permit inductive coupling between the respective induction coils.

Figure 8:
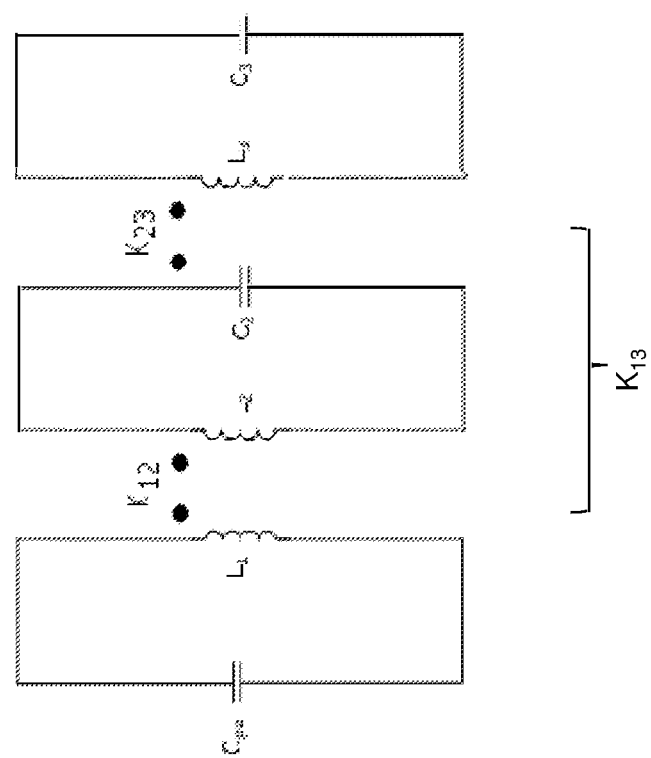
FIG. 8 is a simplified equivalent circuit of the multi-frequency wireless sensor shown in FIG. 7.

FIG. 8 is a schematic diagram showing a simplified equivalent circuit of the sensor 700 of FIG. 7. As can be seen from FIG. 8, the sensor 700 can be modelled as a capacitance $C_{pz}$ (representing the capacitance of the transducer 702) connected in parallel with an inductance $L_1$ (representing the first induction coil 704), a capacitance $C_2$ (representing the capacitance 714) connected in parallel with an inductance $L_2$ (representing the second induction coil 704), and a capacitance $C_3$ (representing the capacitance 716) connected in parallel with an inductance $L_3$ (representing the third induction coil 712). A coupling coefficient $K_{12}$ represents the inductive coupling between the first and second induction coils 704, 710, whilst a coupling coefficient $K_{23}$ represents the inductive coupling between the second and third induction coils 710, 712, and a coupling coefficient $K_{13}$ represents the inductive coupling between the first and third induction coils 704, 712.

The capacitance $C_{pz}$, and inductance $L_1$ form a first resonant circuit having a first resonant frequency, which can be estimated using the equation $$f_1 = \frac{1}{\left(2\pi\sqrt{L_1 C_{pz}}\right)} \quad (6)$$

The capacitance $C_2$, and inductance $L_2$ form a second resonant circuit having a second resonant frequency, which can be estimated using the equation $$f_2 = \frac{1}{\left(2\pi\sqrt{L_2 C_2}\right)} \quad (7)$$

The capacitance $C_3$, and inductance $L_3$ form a third resonant circuit having a second resonant frequency, which can be estimated using the equation $$f_3 = \frac{1}{\left(2\pi\sqrt{L_3 C_3}\right)} \quad (7)$$

Thus, the sensor 700 of FIG. 7 has three resonant frequencies, meaning that when it is excited by excitation signals at appropriate frequencies, e.g. by an inspection wand, the transducer can generate ultrasonic pulses at different frequencies.

The process for designing a sensor of the kind shown in FIG. 3, 5 or 7 involves defining the required operating frequencies of the sensor system and then designing a first induction coil using the equations above to match up the static capacitance of the transducer, such that the combination of the inductance of the coil and the static capacitance of the transducer gives rise to a resonant circuit with a resonant frequency that is equal to or close to one of defined operating frequencies. A second resonant circuit comprising a capacitance and induction coil is then designed, with the capacitance and the inductance of the induction coil being selected such that the second resonant circuit has a resonant frequency that is equal to or close to another of the defined operating frequencies. Further resonant circuits, each comprising a capacitance and induction coil, are then designed, until there is a resonant circuit for each defined operating frequency. The resonant circuits are then assembled, either in the coaxial planar arrangement described above and illustrated in FIGS. 3, 5 and 7, or in any other arrangement or configuration that is convenient to the particular application of the sensors.

It will be appreciated that the series-connected induction coil approach of FIG. 3 can be combined with the inductively coupled induction coil approach of FIGS. 5 and 7 in order to produce a sensor with multiple resonant frequencies. For example, a sensor could be produced having first and second series connected induction coils, as in the example described above with reference to FIG. 3, and a third induction coil that is not electrically connected to either the first or second induction coil, but is instead inductively coupled to the first and/or second induction coil, in the manner described above with reference to FIGS. 5 and 7.

Figure 9:
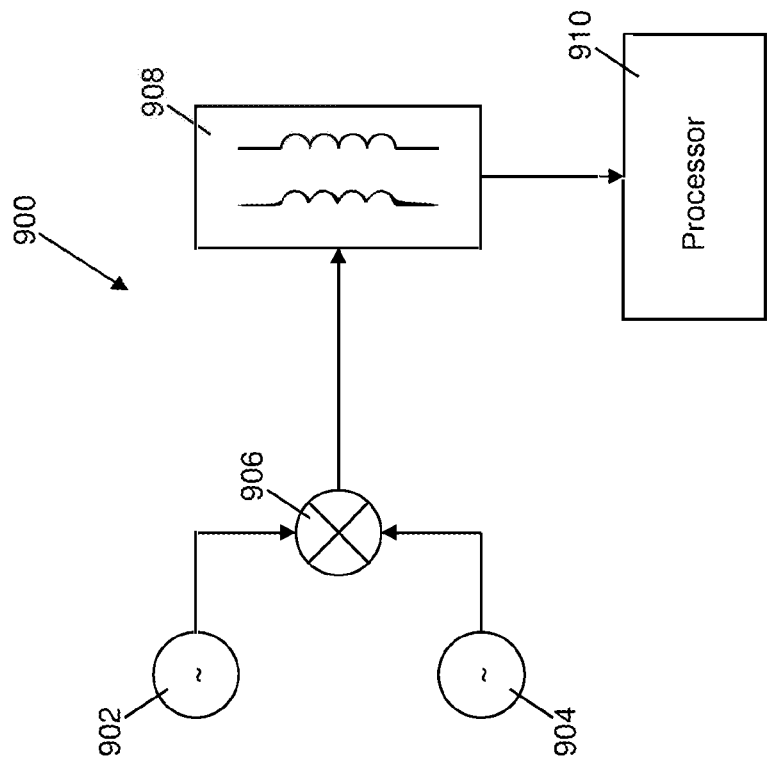
FIG. 9 is a schematic block diagram illustrating functional blocks of an excitation device for exciting the wireless sensors illustrated in FIGS. 3 and 5.

In order to provide excitation signals capable of exciting the sensors described above and shown in FIGS. 3, 5 and 7 a new type of excitation device is required, which is capable of generating and transmitting excitation signals containing multiple different frequencies simultaneously. FIG. 9 is a schematic block diagram illustrating an architecture for such a multi-frequency wireless excitation device.

The device, shown generally at 900 in FIG. 9, is for generating and transmitting an excitation signal containing two different frequencies, and includes a first signal generator 902 for generating a first signal at a first frequency and a second signal generator 904 for generating a second signal at a second frequency. If the excitation signal is required to contain more than two frequencies, then one or more additional signal generators can be added to the device 900 to generate the required additional signals.

Outputs of the first and second signal generators 902, 904 are input to a mixer 906, which generates at its output a composite excitation signal which is the linear sum of the input signals, and therefore contains both the first and second frequencies. Again, if the excitation signal is required to contain more than two frequencies then the output(s) of the additional signal generator(s) can be input to the mixer 906.

The output of the mixer 906 is coupled to an excitation circuit 908 which includes a number of capacitances and induction coils arranged to transmit the composite excitation signal wirelessly, for example to a sensor of the kind described above and illustrated in FIG. 3, 5 or 7. The excitation circuit 908 is also connected to a processing system 910, which is configured to process signals received by the excitation device 900 from a sensor that has been excited by the device 900.

The form of the excitation circuit will depend upon the number of frequencies contained in the composite excitation signal. Some exemplary excitation circuits will now be described with reference to FIGS. 10 to 15.

Figure 10:
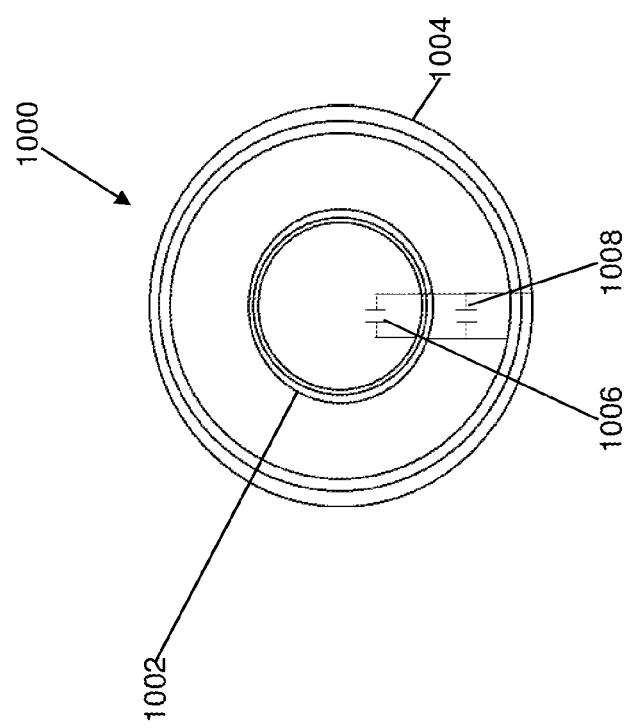
FIG. 10 is a schematic representation of an embodiment of an excitation circuit of the excitation device illustrated in FIG. 9.

FIG. 10 is a schematic representation of an excitation circuit for transmitting an excitation signal containing two frequencies. The excitation circuit, shown generally at 1000 in FIG. 10, includes a first generally circular induction coil 1002 connected in series with a second generally circular induction coil 1004. A first capacitance 1006 is connected in parallel with the first induction coil 1004. A second capacitance 1008 is connected in parallel with the series combination of the first and second induction coils 1002, 1004.

In the illustrated example, the first and second induction coils 1002, 1004 and the first and second capacitances 1006, 1008 are mounted in a planar arrangement (i.e. they all occupy substantially the same plane) on a substrate, with the first and second induction coils 1002, 1004 being positioned in a coaxial arrangement, with the first induction coil 1002 being positioned within the second induction coil 1004. Again, however, this arrangement need not be adopted; the first and second and third induction coils 1002, 1004 and capacitances 1006, 1008 can be arranged in any configuration that is convenient for the requirements of a particular application of the excitation circuit 1000, and may, for example, occupy different planes. Equally, the first and second induction coils 1002, 1004 need not be positioned in the illustrated coaxial arrangement, but may be arranged in any configuration that is convenient for the requirements of a particular application of the excitation circuit 1000.

The excitation circuit 1000 is configured to receive the excitation signal output by the mixer 906 in order to transmit the excitation signal, for example to a sensor of the kind described above and illustrated in FIG. 3, 5 or 7.

Figure 11:
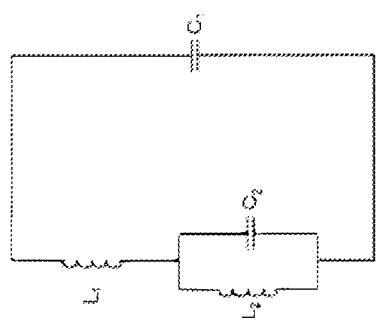
FIG. 11 is a simplified equivalent circuit of the excitation circuit shown in FIG. 10.

FIG. 11 is a simplified equivalent circuit of the excitation circuit 1000 shown in FIG. 10, from which it can be seen that the excitation circuit can be modelled as a capacitance $C_1$ (representing the first capacitance 1006) connected in parallel with a series arrangement of two inductances $L_1$ (representing the first induction coil 1002) and $L_2$ (representing the second induction coil 1004), and a capacitance $C_2$ (representing the second capacitance 1008) connected in parallel with the second inductance $L_2$.

The capacitance $C_1$, inductances $L_1$ and $L_2$ and capacitance $C_2$ form a resonant circuit having a first resonant frequency which can be estimated using the equation $$f_1 = \frac{1}{\left(2\pi\sqrt{L_1 C_1}\right)} \quad (8)$$

And a second resonant frequency, which can be estimated using the equation $$f_2 = \frac{1}{\left(2\pi\sqrt{L_2 C_2}\right)} \quad (9)$$

Thus, the excitation circuit 1000 of FIG. 10 has two resonant frequencies, meaning that when it is excited by a composite excitation signal containing two frequencies, then both of those frequencies are transmitted.

Figure 12:
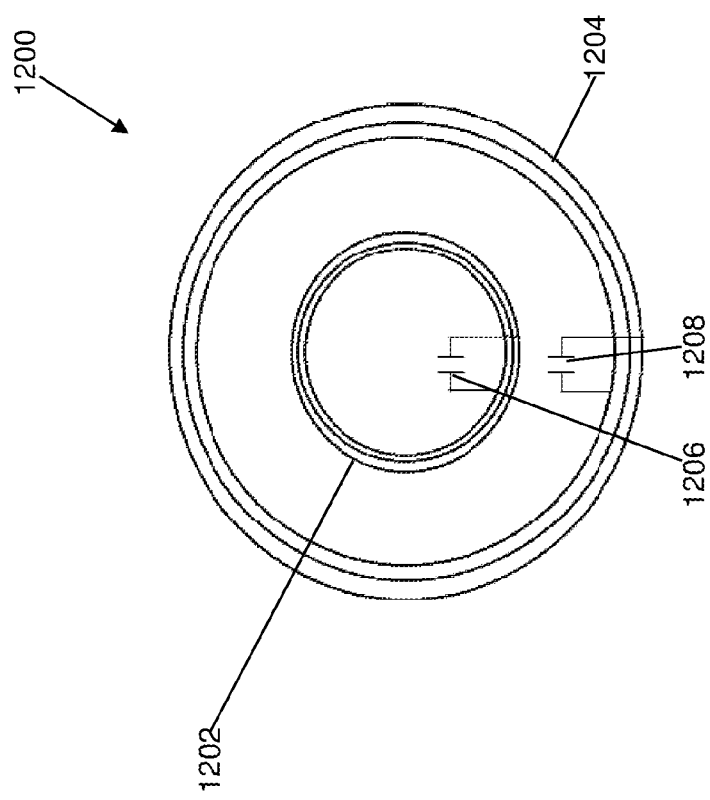
FIG. 12 is a schematic representation of an alternative embodiment of an excitation circuit of the excitation device illustrated in FIG. 9.

FIG. 12 is a schematic representation of an alternative excitation circuit for transmitting an excitation signal containing two frequencies.

The excitation circuit, shown generally at 1200, comprises a first generally circular induction coil 1202 and a second generally circular induction coil 1204. The first and second induction coils 1202, 1204 are not electrically connected but are instead inductively coupled to one another.

A first capacitance 1206 is connected in parallel with the first induction coil 1202, whilst a second capacitance 1208 is connected in parallel with the second induction coil 1204.

In the illustrated example, the first and second induction coils 1202, 1204 and the first and second capacitances 1206, 1208 are mounted in a planar arrangement (i.e. they all occupy substantially the same plane) on a substrate, with the first and second induction coils 1202, 1204 being positioned in a coaxial arrangement, with the first induction coil 1202 being positioned within the second induction coil 1204. Again, however, this arrangement need not be adopted; the first and second induction coils 1202, 1204 and capacitances 1206, 1208 can be arranged in any configuration that is convenient for the requirements of a particular application of the excitation circuit 1200, and may, for example, occupy different planes. Equally, the first and second induction coils 1206, 1208 need not be positioned in the illustrated coaxial arrangement, but may be arranged in any configuration that is convenient for the requirements of a particular application of the excitation circuit 1200, provided that the first and second induction coils 1202, 1204 are positioned so as to permit inductive coupling between the first and second induction coils 1202, 1204.

The excitation circuit 1200 is configured to receive the excitation signal output by the mixer 906 in order to transmit the excitation signal, for example to a sensor of the kind described above and illustrated in FIG. 3, 5 or 7.

Figure 13:
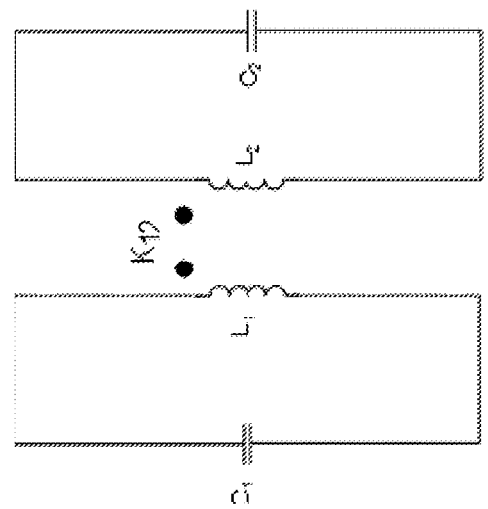
FIG. 13 is a simplified equivalent circuit of the excitation circuit shown in FIG. 12.

FIG. 13 is a simplified equivalent circuit of the excitation circuit 1200 shown in FIG. 12, from which it can be seen that the excitation circuit 1200 can be modelled as a capacitance $C_1$ (representing the first capacitance 1206) connected in parallel with an inductance $L_1$ (representing the first induction coil 1202) and a capacitance $C_2$ (representing the second capacitance 1208) connected in parallel with an inductance $L_2$ (representing the second induction coil 1204). A coupling coefficient $K_{12}$ represents the inductive coupling between the first and second induction coils 1202, 1204.

The capacitance $C_1$ and inductance $L_1$ form a first resonant circuit having a first resonant frequency, which can be estimated using the equation $$f_1 = \frac{1}{(2\pi\sqrt{L_1 C_1})}. \tag{10}$$

The capacitance $C_2$ and inductance $L_2$ form a second resonant circuit having a second resonant frequency, which can be estimated using the equation $$f_2 = \frac{1}{(2\pi\sqrt{L_2 C_2})}. \tag{11}$$

Thus, the excitation circuit 1200 of FIG. 12 has two resonant frequencies, meaning that when it is excited by a composite excitation signal containing two frequencies, then both of those frequencies are transmitted.

Figure 14:
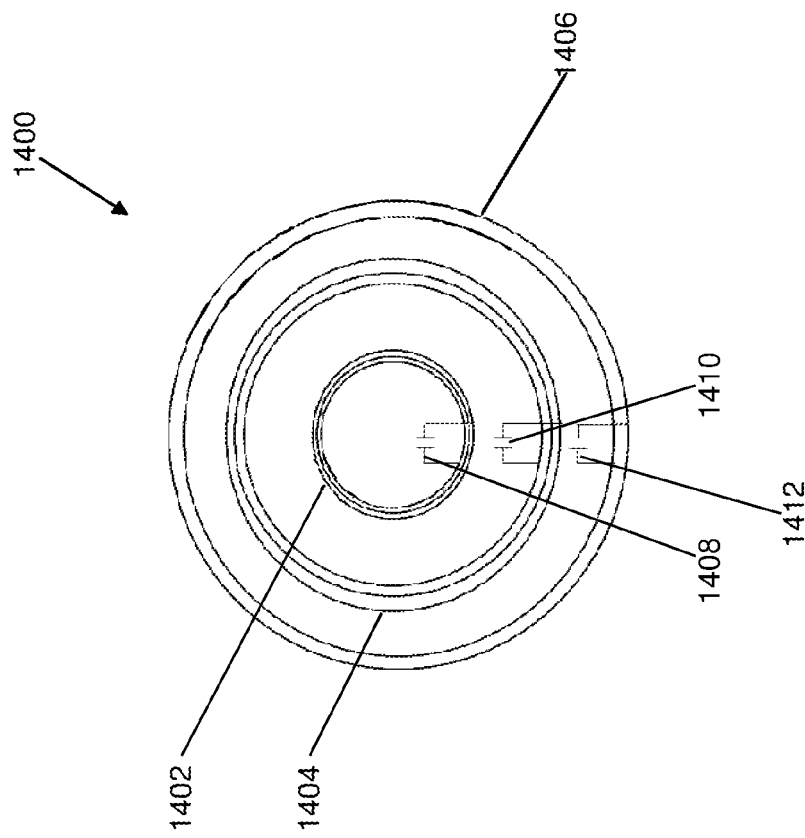
FIG. 14 is a schematic representation of an embodiment of an excitation circuit of an excitation device for exciting the wireless sensor illustrated in FIG. 7.

FIG. 14 is a schematic representation of an excitation circuit for transmitting an excitation signal containing three frequencies.

The excitation circuit, shown generally at 1400, comprises a first generally circular induction coil 1402, a second generally circular induction coil 1404 and a third generally circular induction coil 1406. The first and second induction coils 1402, 1404 are not electrically connected, but are instead inductively coupled to one another. Similarly, the second and third induction coils 1404, 1406 are not electrically connected, but are instead inductively coupled to one another.

A first capacitance 1408 is connected in parallel with the first induction coil 1402, whilst a second capacitance 1410 is connected in parallel with the second induction coil 1404 and a third capacitance 1412 is connected in parallel with the third induction coil 1406.

In the illustrated example, the first, second and third induction coils 1402, 1404, 1406 and the first, second and third capacitances 1408, 1410, 1412 are mounted in a planar arrangement (i.e. they all occupy substantially the same plane) on a substrate, with the first, second and third induction coils 1402, 1404, 1406 being positioned in a coaxial arrangement, with the first induction coil 1402 being positioned within the second induction coil 1404, and the second induction coil 1404 being positioned within the third induction coil 1406. Again, however, this arrangement need not be adopted; the first, second and third induction coils 1402, 1404, 1406 and the first, second and third capacitances 1408, 1410, 1412 can be arranged in any configuration that is convenient for the requirements of a particular application of the excitation circuit 1400, and may, for example, occupy different planes. Equally, the first, second and third induction coils 1402, 1404, 1406 need not be positioned in the illustrated coaxial arrangement, but may be arranged in any configuration that is convenient for the requirements of a particular application of the excitation circuit 1400, provided that the first, second and third induction coils 1402, 1404, 1406 are positioned so as to permit inductive coupling between the respective induction coils.

The excitation circuit 1400 is configured to receive the excitation signal output by the mixer 906 in order to transmit the excitation signal, for example to a sensor of the kind described above and illustrated in FIG. 3, 5 or 7.

Figure 15:
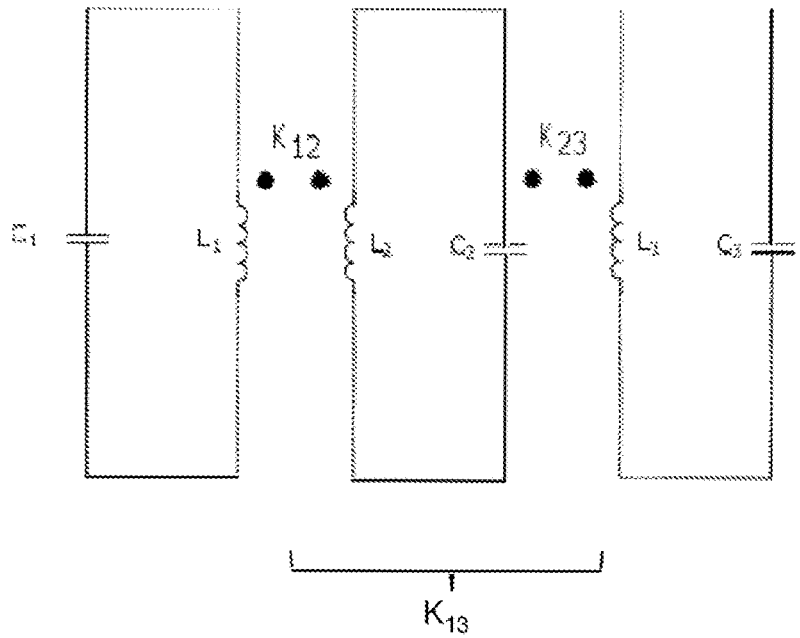
FIG. 15 is a simplified equivalent circuit of the excitation circuit shown in FIG. 14.

FIG. 15 is a simplified equivalent circuit of the excitation circuit 1400 shown in FIG. 14, from which it can be seen that the excitation circuit 1400 can be modelled as a capacitance $C_1$ (representing the first capacitance 1408) connected in parallel with an inductance $L_1$ (representing the first induction coil 1402), a capacitance $C_2$ (representing the second capacitance 1410) connected in parallel with an inductance $L_2$ (representing the second induction coil 1404) and a capacitance $C_3$ (representing the third capacitance 1412) connected in parallel with an inductance $L_3$ (representing the third induction coil 1406). A coupling coefficient $K_{12}$ represents the inductive coupling between the first and second induction coils 1402, 1404, whilst a coupling coefficient $K_{23}$ represents the inductive coupling between the second and third induction coils 1404, 1406, and a coupling coefficient $K_{13}$ represents the inductive coupling between the first and third induction coils 1402, 1406.

The capacitance $C_1$ and inductance $L_1$ form a first resonant circuit having a first resonant frequency, which can be estimated using the equation $$f_1 = \frac{1}{(2\pi\sqrt{L_1 C_1})}. \tag{12}$$

The capacitance $C_2$ and inductance $L_2$ form a second resonant circuit having a second resonant frequency, which can be estimated using the equation $$f_2 = \frac{1}{(2\pi\sqrt{L_2 C_2})}. \tag{13}$$

The capacitance $C_3$ and inductance $L_3$ form a third resonant circuit having a third resonant frequency, which can be estimated using the equation $$f_3 = \frac{1}{(2\pi\sqrt{L_3 C_3})}. \tag{14}$$

Thus, the excitation circuit 1400 of FIG. 14 has three resonant frequencies, meaning that when it is excited by a composite excitation signal containing three frequencies, then both of those frequencies are transmitted.

Again, it will be appreciated that the series-connected induction coil approach of FIG. 10 can be combined with the inductively coupled induction coil approach of FIGS. 12 and 14 in order to produce an excitation circuit with multiple resonant frequencies. For example, an excitation circuit could be produced having first and second series connected induction coils, as in the example described above with reference to FIG. 10, and a third induction coil that is not electrically connected to either the first or second induction coil, but is instead inductively coupled to the first and/or second induction coil, in the manner described above with reference to FIGS. 12 and 14.

The excitation circuit of the excitation device 900 is described above as having transmitting coils (in the form of the induction coils 1002, 1004, 1202, 1204, 1402, 1404, 1406), as those are the parts most relevant to the present invention. However, those skilled in the art will appreciate that the excitation circuit also includes a receiving coil (for detecting the sensor's response to the bulk wave and guided wave excitation signals). The design of the receiving coil is generally the same as the transmitting coil, but the receiving coil may be of a different size.

As will be appreciated from the foregoing description, the present invention provides a wireless sensor and complementary excitation device that can be used for both guided wave and bulk wave non-destructive testing simultaneously, thus reducing the time and cost involved in performing such non-destructive testing, and reducing the weight of, and physical space occupied by, the sensor.

In use, one or more multi-frequency wireless sensors of the kind described above and illustrated in FIGS. 3, 5, 7 and 9 are installed on or in an object to be tested. An excitation device, for example a multi-frequency excitation device of the kind described above and illustrated in FIGS. 9-15 is used to apply a bulk wave (for inspecting the structure of the object immediately beneath the sensor) and/or guided wave (for inspecting the structure in the area around the sensor) excitation signal to a sensor, via inductive coupling between the sensor and the excitation device, which causes excitation of the sensor. If a suitable excitation device is used (e.g. the excitation device of the kind described above and illustrated in FIGS. 9-15), the bulk wave and the guided wave can be transmitted to the sensor simultaneously. The sensor responds to the excitation signal by generating and transmitting ultrasonic pulses which travel through the structure and are reflected off structural features such as fixtures and supports. The sensor detects the reflected pulses and generates a response signal which is transmitted to the excitation device, again via inductive coupling between the sensor and the excitation device. In this way, the structure of the objected can be examined.

As each sensor is installed in a different location on or in the object to be tested, each sensor is a different distance away from structural features such as fixtures and supports. Thus, each sensor will generate a different and unique response to a guided wave excitation signal. This unique guided wave response can be recorded for each sensor, and can subsequently be used as a unique identifier for the sensor within the object to be tested. The unique identifiers for the sensors can be associated with structural information about the object being tested as well as NDT results. Therefore, the sensor itself can be used for identification and provides an easy method for inspectors and plant operators to track the operating and health conditions of the object being tested over a period of time.

Figure 16:
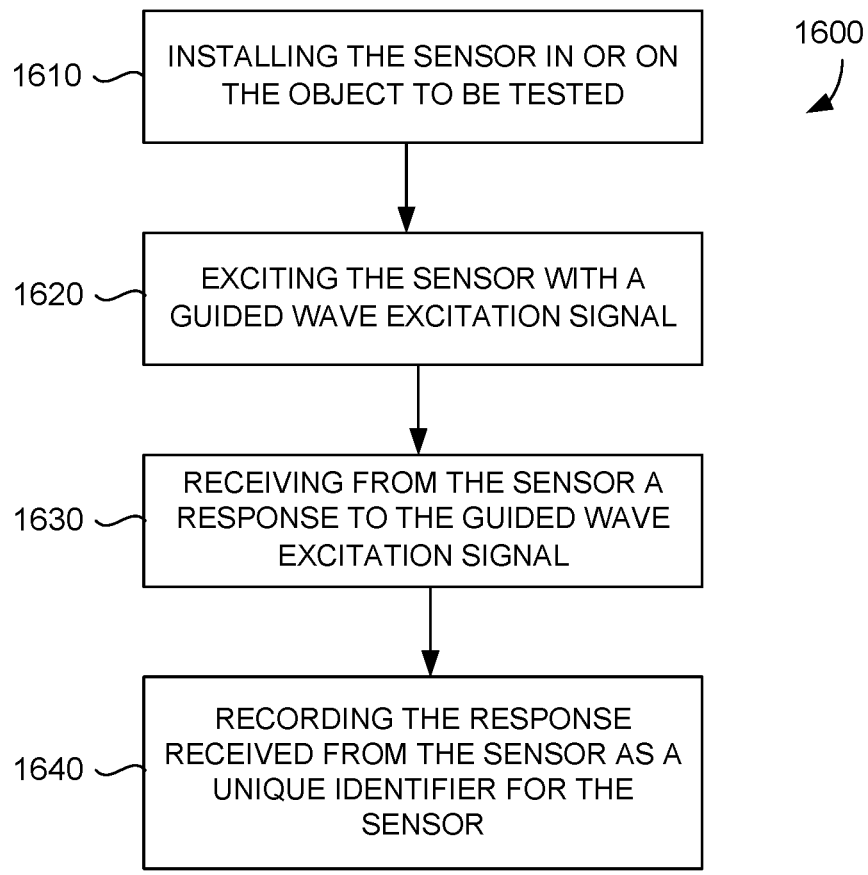
FIG. 16 is a flow diagram illustrating steps of a method for non-destructive testing of an object.

FIG. 16 illustrates steps of a method 1600 for non-destructive testing of an object using a multi-frequency wireless sensor for non-destructive testing of a test object, the sensor comprising an ultrasound transducer having a plurality of operating frequencies, a first induction coil electrically coupled to the ultrasound transducer, a second induction coil, and a capacitance connected in parallel with the second induction coil such that the wireless sensor can operate at a first operating frequency or a second operating frequency when the sensor is excited by a remote device sensor. The method 1600 may include, at 1610, installing the sensor in or on the object to be tested. The method 1600 may further include, at 1620, exciting the sensor with a guided wave excitation signal. The method 1600 may further include, at 1630, receiving from the sensor a response to the guided wave excitation signal. The method 1600 may include, at 1640, recording the response received from the sensor as a unique identifier for the sensor.

The invention claimed is:

1. A multi-frequency wireless excitation device for exciting a multi-frequency wireless sensor, the excitation device comprising:
   a first induction coil;
   a first capacitance electrically coupled to the first induction coil;
   a second induction coil not electrically connected to the first induction coil, but inductively coupled to the first induction coil; and
   a second capacitance connected in parallel with the second induction coil, such that the excitation device can generate an induction signal at a first operating frequency or a second operating frequency.

2. A multi-frequency wireless excitation device according to claim 1 wherein the first capacitance is connected in parallel with the first induction coil.

3. A multi-frequency wireless excitation device according to claim 1 further comprising:
   means for generating a first excitation signal at a first frequency;
   means for generating a second excitation signal at a second frequency; and
   means for linearly summing the first and second excitation signals in order to generate a composite excitation signal for exciting the first and second induction coils.

4. A multi-frequency wireless sensor for non-destructive testing of a test object, the sensor comprising:
   an ultrasound transducer having a plurality of operating frequencies;
   a first induction coil electrically coupled to the ultrasound transducer;
   a second induction coil, wherein the second induction coil is not electrically connected to the first induction coil, but is inductively coupled to the first induction coil; and
   a capacitance, connected in parallel with the second induction coil, such that the wireless sensor can operate at a first operating frequency or a second operating frequency when the sensor is excited by a remote device.

5. A method for non-destructive testing of an object using a multi-frequency wireless sensor for non-destructive testing of a test object, the sensor comprising an ultrasound transducer having a plurality of operating frequencies, a first induction coil electrically coupled to the ultrasound transducer, a second induction coil, and a capacitance connected in parallel with the second induction coil such that the wireless sensor can operate at a first operating frequency or a second operating frequency when the sensor is excited by a remote device, the method comprising:
   installing the sensor in or on the object to be tested;
   exciting the sensor with a guided wave excitation signal;
   receiving from the sensor a response to the guided wave excitation signal; and
   recording the response received from the sensor as a unique identifier for the sensor.

6. A method according to claim 5 further comprising: exciting the sensor with a bulk wave excitation signal.

7. A method according to claim 6 wherein the guided wave excitation signal and the bulk wave excitation signal are transmitted to the sensor simultaneously.

* * * * *